Aug. 9, 1938.  J. R. BREUCHAUD  2,126,168
APPARATUS FOR TREATING ORGANIC MATERIAL
Filed May 10, 1933   2 Sheets-Sheet 1
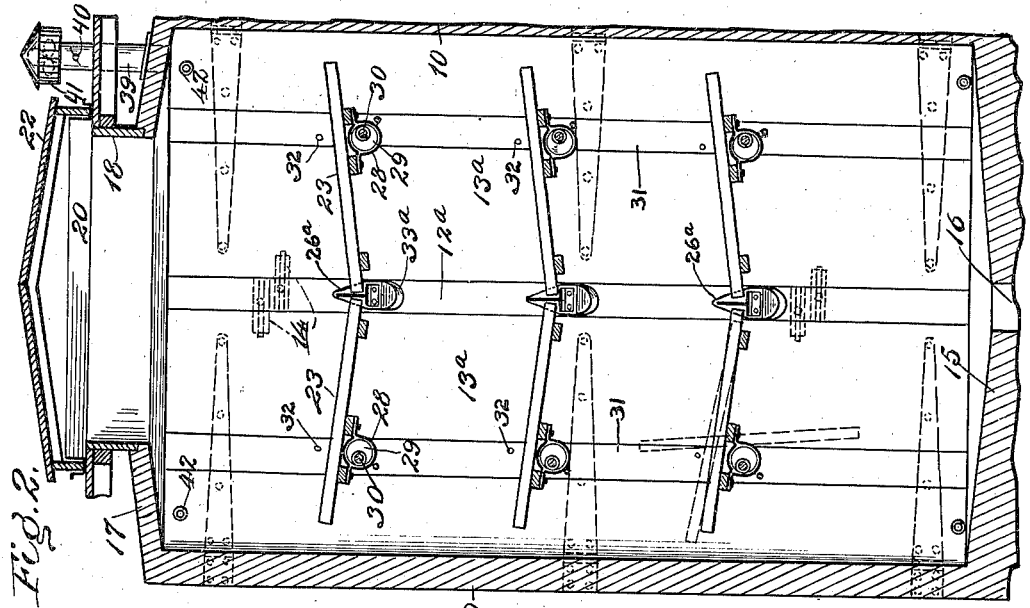
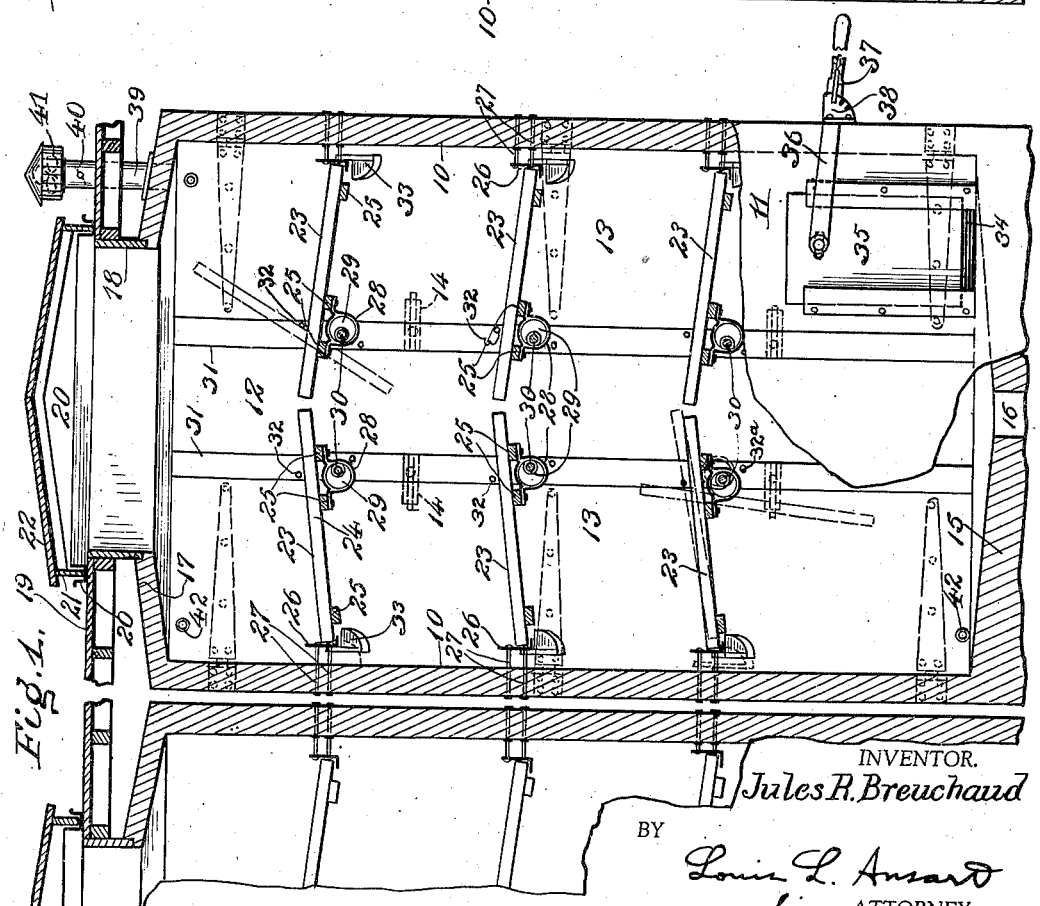
INVENTOR.
Jules R. Breuchaud
BY
Louis L. Ansart
his ATTORNEY.

Aug. 9, 1938.   J. R. BREUCHAUD   2,126,168
APPARATUS FOR TREATING ORGANIC MATERIAL
Filed May 10, 1933   2 Sheets-Sheet 2
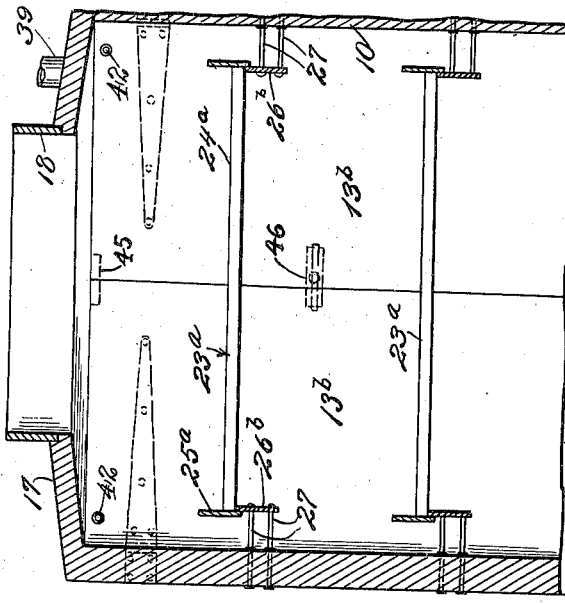
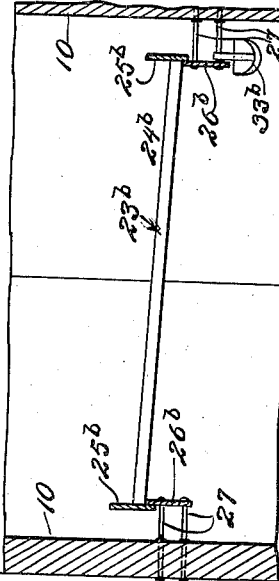
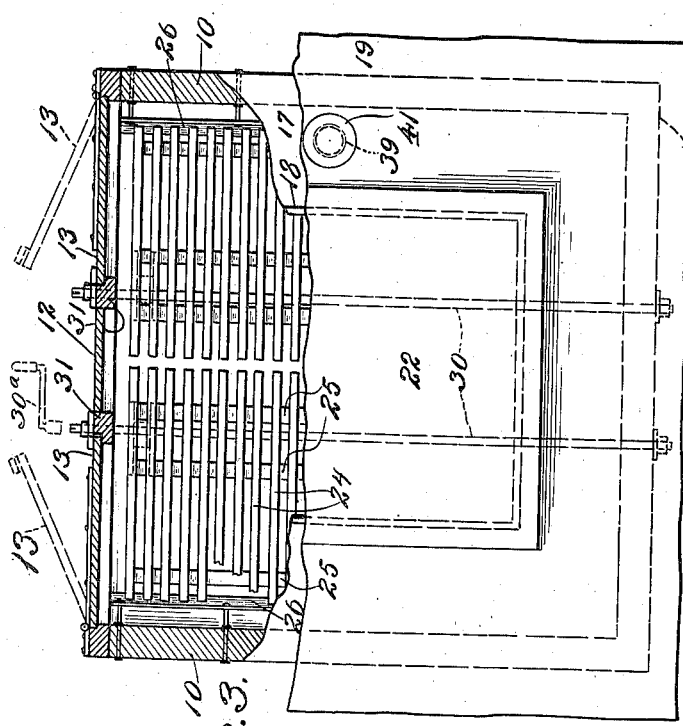
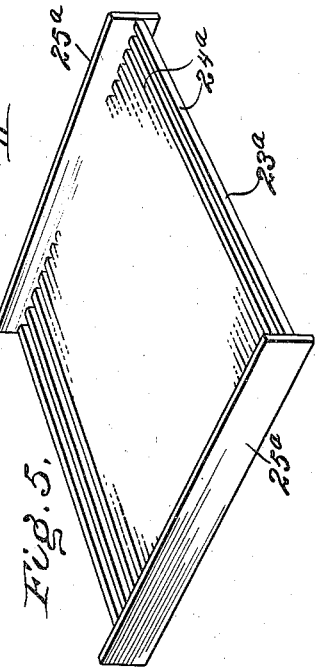
INVENTOR.
Jules R. Breuchaud
BY
his ATTORNEY.

Patented Aug. 9, 1938

2,126,168

UNITED STATES PATENT OFFICE 2,126,168

APPARATUS FOR TREATING ORGANIC MATERIAL

Jules R. Breuchaud, New York, N. Y., assignor to Sealcell Corporation, a corporation of New York Application May 10, 1933, Serial No. 670,277

11 Claims. (Cl. 23—259.1)

The present invention relates to a means for converting into humus or the like, suitable for use as a fertilizer, waste organic matter such as garbage, sewage sludge, sewage screenings or combination thereof.

The main object of the invention relates to the provision of improved means for converting waste organic matter into a suitable product such as humus. An important feature relates to the use of artificial heat to facilitate fermentation during the early stages thereof and to help maintain it. Another feature relates to improvements in drainage of the material in connection with the fermentation thereof. A further feature relates to provisions for exposing the material more completely than heretofore to the action of the air. Another feature relates to the manner in which cells are filled and are emptied at the end of the converting operation. Another feature relates to improvements in control of the supply of air to the fermentation cell whereby the supply of air may be shut off during the starting of the fermentation action, may then be supplied in moderate quantities to aid fermentation and finally may be drawn through the cell in generous quantities to improve the condition of the organic material.

Other objects and advantages will appear upon consideration of the accompanying description and of the drawings, in which Fig. 1 is a rear elevation, partly in section, illustrating one embodiment of the invention;

Fig. 2 is a sectional rear elevation of a modified form of apparatus;

Fig. 3 is a top plan view, partly broken away to show underlying structure, of the structure shown in Fig. 1;

Fig. 4 is a fragmentary vertical section of another modification;

Fig. 5 is a perspective view of a tray for use in the cell illustrated in Fig. 4; and Fig. 6 is a fragmentary vertical section, similar in general to that shown in Fig. 4 but arranged for the support of trays in inclined position to facilitate drainage.

Referring to the drawings, there is shown in Fig. 1 a fermentation cell having single walls 10, a rear wall 11, a central wall section 12 at the front of the cell, and doors 13 for closing the openings between the side walls and said central wall section. Preferably said doors 13 are hinged at their outer edges to side walls 10 and at their inner edges may be provided with fastening devices, such as bolts 14, by which they may be secured in closed position. The floor 15 is inclined so as to drain readily into a drain or outlet 16.

At its top the fermentation cell is provided with a roof 17 having a central charging opening into which fits the lower end of a chute 18 extending downwardly from a charging floor 19. The upper end of the chute is surrounded by a channel 20 adapted to receive the lower edge of a peripheral flange 21 of a cover 22. Preferably the interior of the cell is as free as possible from more or less accessible recesses in which organic material may collect and become offensive. This result and other advantages may conveniently be attained by building the cell of concrete.

It is of importance to provide for adequate circulation of air over and around the masses of organic matter to be converted into humus, thus aiding aerobic bacterial action as well as drying the material. According to the present invention these results may be obtained in considerable measure by supporting the trays with their edges spaced substantially from the walls of the cell. The converting action may also be facilitated by providing for improved drainage of liquid from the organic material under treatment. In working to these ends, it has been found convenient to use, instead of trays extending completely across the cell, two sets of trays 23 each formed of a series of cross members 24 secured to longitudinal members 25.

As shown in Fig. 1, the trays 23 may slope downwardly from the middle of the cell toward the side walls and may conveniently be supported at their outer edges on inwardly extending lower flanges of angles 26 whose other flanges are in upright position and may serve not only to provide a strong support for the outer edges of the trays 23 but may also act to prevent material dumped on the trays from spilling over the outer edges thereof. The angles 26 are spaced from the side walls 10 to facilitate circulation of air and may be supported in any suitable manner, as on the inner ends of bolts 27 secured in the side walls 10 and projecting inwardly therefrom.

It is also a purpose of the invention to facilitate control of the trays and, in this particular embodiment of the invention, to avoid any direct manual handling of the trays except, for example, in connection with loading them. To this end each tray 23 may be provided near its inner edge with eccentric straps 28 attached to suitable positioned longitudinal members 25 and embracing eccentrics 29 mounted on shafts 30 rotatably supported by the rear wall 11 of the cell and by posts 31 at the front of the cell and at the edges of the front wall section 12.

The shafts 30 pass through the posts 31 and at their forward ends are provided with suitable shaped ends to enable them to be operated by a corresponding socket wrench 30a. By turning any one of the shafts 30 the corresponding tray may be pulled off the corresponding flange of an angle 26, thus permitting a tray to swing downwardly for dumping purposes, as indicated in dotted lines in the lower left hand part of Fig. 1. In dumping the converted material, the lowest pair of trays is dumped and this operation is repeated in succession for each of the pairs above said lowest pair. In loading the trays for another operation, the lowermost trays would be put into loading position and all of the others would be turned up beginning with the top pair of trays and working down pair by pair. While the trays are in raised position, they are held there by pins or other suitable devices 32, as indicated at the upper right hand side of Fig. 1. Then after the lower trays are loaded the trays immediately above are again placed in loading position. It will be evident that the rotation of the shafts 30 in the opposite directions should be limited. This may be done by means of stops 32a which the eccentric straps 28 engage on one side or the other as shown at the lower left hand side of Fig. 1. The same result might also be obtained in many other ways, for example, by use of two stops secured to a shaft 30 adjacent to a post 31 and adapted to cooperate with a stationary stop corresponding to stops 32a.

Liquid draining to the sides of the cell is collected in troughs 33 suspended from bolts 27 at both sides of the cell and shiftable along said bolts from operating positions under the angles 26 to inoperative positions, as shown in dotted lines for the lowest left hand tray in Fig. 1, so as not to interfere with dumping. These troughs are inclined toward one end of the cell where the collected liquid drops to the floor 15 and flows to the drain 16.

To provide for controlled circulation of air, provision is made of one or more suitably screened openings 34 at which the passage of air is controlled by a sliding door 35 movable, through a pin and slot connection, by a lever 36 which may be held in adjusted position by means of a latch finger 37 cooperating with notches in a locking quadrant 38. The cell is also provided at its top with one or more ventilator pipes 39 containing dampers 40 and having at their upper ends motor driven fans 41 for drawing air from the cell.

The invention also contemplates the introduction of artificial heat into the cell to encourage and hasten fermentation. Such artificial heat may be introduced in various ways as by a system of piping 42 in which is circulated a suitable heating medium such as hot water, steam or hot air. This artificial heat would be of great value in hastening fermentation of garbage and of still greater value in starting fermentation of screenings and sludge. This quickening of the process of fermentation may be effected to advantage by raising the temperature at the interior of the cell rapidly to somewhere in the neighborhood of 120° to 150°. The fermentation cycle will be correspondingly shortened and the quantity of waste material converted into humus in a given time may be very much increased.

Insofar as the heating and ventilation of the cell are concerned, at starting the operation of the fermentation cell the sliding door 35 and the damper 40 are closed, and the heating medium is admitted to the piping 42. By rapidly heating the material to raise its temperature at once to about 120 to 150 degrees instead of waiting for this temperature to be reached by heat given off by the fermenting material, anaerobic action will be encouraged and the fermentation cycle will be shortened to a substantial degree. After the fermentation cycle is thoroughly started, the door 35 and damper 40 are opened to the required extent to admit air to assist the action of aerobic bacteria, and when fermentation has practically ceased the motor driven fan is started to draw air through the cell and complete the treatment, thus assuring a relatively dry product. The supply of air to the air space around the trays and through the cell induces and helps fermentation and also helps in drying the masses of organic matter.

Referring to Fig. 2, most of the parts are the same as in Fig. 1 and may be designated by the same reference numerals. The trays 23 are, however, reversed in position, the shafts 30 carrying the eccentrics 29 and the supporting posts 31a being nearer the side walls 10 in Fig. 2 and the trays 23 sloping downwardly toward the middle of the cell where their inner edges rest on the side flanges of inverted T's 26a supported by the back wall of the cell and by an upright central post 12a against which the doors 13a are held by bolts 14. In this form of apparatus the doors 13a must be provided with holes (not shown) through which the ends of the shafts 30 can be engaged by the socket wrench 30a. In this form of cell there are troughs 33a suspended from the inverted T's 26a.

The form of apparatus shown in Fig. 4 has many parts corresponding to those of the cell shown in Fig. 1 and which may be designated by the same reference numerals. As here shown, however, the tray supports 26b carried by the bolts 27 are in the form of vertically arranged plates on which rest cross bars 24a of a tray 23a, said bars 24a being secured at their ends to vertical plates 25A which engage the plates 26A at their outer sides. These trays 23a may be removed and inserted through the open front end of the cell, the doors 13b being for this purpose arranged to fit together at the center without having any central post. The doors 13b engage stops 45 at the top and bottom and the doors are secured against the stops by means including a bolt 46 securing the two doors together. The trays 23a are preferably made in sections from front to back to facilitate the insertion and removal of the trays and materials thereon.

Fig. 6 shows an arrangement very similar to that in Fig. 4, the main difference being in having an inclined tray 23b to produce drainage to one side. Adjacent to the lower side of the tray, there is provided a trough 33b suspended from the bolts 27.

It will be seen that various changes can be made in construction and arrangement and various features may be used without others without departing from the true scope and spirit of the invention.

Having thus described my invention, I claim:—

1. In apparatus for converting organic matter, the combination of a fermentation cell, means for admitting air at the lower part of the cell including an opening and a member to close said opening or to open it to desired extents, a conduit at the top of the cell for discharge of gaseous products of combustion, a damper in said conduit, means for drawing air through said cell and conduit, means for supporting the organic matter at different levels, and means including heating pipes extending into said cell for heating the same up quickly after charging the same with organic matter and thereby shortening the time required for fermentation.

2. In apparatus for converting organic matter, the combination of a fermentation cell having provision for admission of air thereto and discharge therefrom of gaseous products of combustion, a series of openwork supporting devices at different heights and having their edges spaced from the sides of the cell to permit the passage of air and gaseous products of fermentation, and means for heating the interior of the cell including heat pipes located beneath the spaces between the supporting devices and the sides of the cell and tending to produce a draft upwardly therethrough.

3. In apparatus for converting organic matter, the combination of a fermentation cell having provision for admission of air thereto and discharge therefrom of gaseous products of combustion and a plurality of supporting devices including trays for organic matter at different levels, each including a support on which one edge of said tray rests, and means toward the opposite edge of said tray for supporting the tray and for drawing it off the support at the other edge to effect dumping of material from the tray.

4. In apparatus for converting organic matter, the combination of a fermentation cell, and vertically separated supporting devices each including two trays normally extending from the middle of the cell toward opposite sides thereof, fixed supports on which the outer edges rest, a shaft near the inner edge of each tray, eccentrics on said shaft, and eccentric holders embracing the eccentrics and secured to the trays, whereby rotation of the shafts will draw the outer edges of the trays off the supports and cause dumping.

5. In apparatus for converting organic matter, the combination of a fermentation cell, vertically separated supporting devices each including two trays inclined downwardly from the middle of the cell toward the sides, fixed supports for the outer edges of said trays, said fixed supports being spaced from the sides of the cell, and drainage troughs beneath said supports to receive and discharge liquid drained from material on the trays.

6. In apparatus for converting organic matter, the combination of a fermentation cell, vertically separated supporting devices each including two trays inclined downwardly from the middle of the cell toward the sides, fixed supports for the outer edges of said trays, said fixed supports being spaced from the sides of the cell, means for holding material on the trays from spilling over the outer sides of the fixed supports, and means for carrying off liquid draining along said trays to said fixed supports.

7. In apparatus for converting organic material, the combination of a fermentation cell, vertically separated supporting devices each including two trays spaced from the sides of the cell and normally sloping downwardly towards the middle of the cell to cause liquid in the organic material to drain in that direction, a common support for the inner edges of the trays, and a drain trough suspended beneath said common support.

8. In apparatus for converting organic matter, the combination of a fermentation cell, vertically separated supporting devices each including two trays spaced from the sides of the cell and normally sloping downwardly toward the middle of the cell, a common support for the inner edges of the trays, a shaft beneath the outer portion of each tray, and a connection between the shaft and the tray whereby turning of the shaft may be utilized to draw the inner edge of the tray off its support.

9. In apparatus for converting organic matter, the combination of a fermentation cell and vertically separated supporting devices each including a tray having vertical plates at its edges and cross bars joining said plates, and vertical tray supporting members spaced from the opposite sides of the cell to provide for the passage of air and fermentation gases and in position to be engaged by the cross bars of said tray when the plates at the tray edges are passed outside of the tray supporting members, the dimensions of the tray being less than the interior dimensions of the cell to provide for such passage of air and gases.

10. In apparatus for converting organic matter, the combination of a fermentation cell, vertically separated supporting devices each including supporting members arranged at different heights at opposite sides of the cell and a tray supported in inclined position on said supporting members and consisting of parallel bars in the same plane and plates joining the ends of said bars and arranged so that they will be vertical when the tray is in its inclined position.

11. In apparatus for converting organic matter, the combination of a fermentation cell, means for admitting air at the lower part of the cell including an opening and a closure therefor adjustable to close the opening or to open it to desired extents, an outlet at the top of said cell for discharge of gaseous products of fermentation, damping means for said outlet, means for drawing air through said cell and outlet, means for supporting the organic material at different levels, and means for heating the interior of the cell up to a desired temperature quickly after charging the same, thereby shortening the time required for fermentation.

JULES R. BREUCHAUD.